No. 635,744.  
A. CATUDAL.  
BICYCLE.  
(Application filed June 7, 1899.)  
Patented Oct. 31, 1899.
(No Model.)
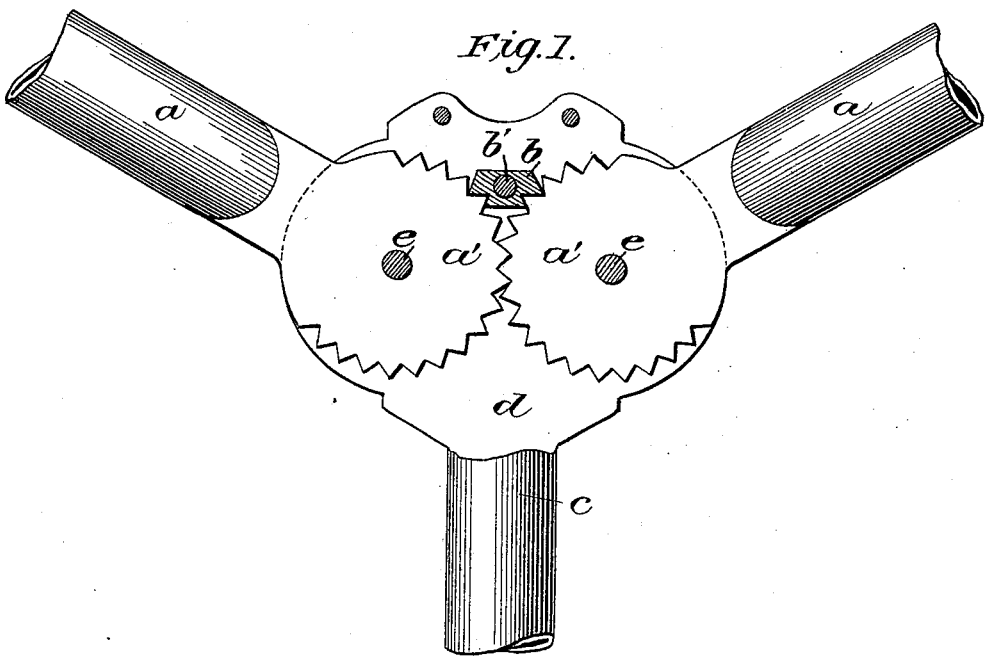
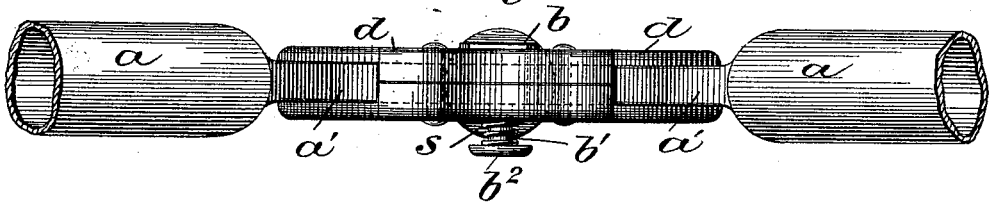
Witnesses.  
L. D. Adams  
F. Hathaway
Inventor.  
Arthur Catudal  
by Henry W. Mason  
Atty.

UNITED STATES PATENT OFFICE.

ARTHUR CATUDAL, OF NEW BEDFORD, MASSACHUSETTS.

BICYCLE.

SPECIFICATION forming part of Letters Patent No. 635,744, dated October 31, 1899.

Application filed June 7, 1899. Serial No. 719,743. (No model.)

*To all whom it may concern:*

Be it known that I, ARTHUR CATUDAL, a subject of the Queen of Great Britain, residing at New Bedford, in the county of Bristol and State of Massachusetts, have invented certain new and useful Improvements in Bicycles, of which the following is a specification, reference being had to the accompanying drawings, in which—

Figure 1 is a rear view of the top of the front standard of a bicycle provided with my improvements, having a portion broken away and showing only the contiguous portions of said front standard and of the handle-bars. Fig. 2 is a top view of the mechanism shown in Fig. 1.

My invention relates to bicycles, and has for its object to render the handle-bars of a bicycle capable of instant adjustment to any desired height by the rider while riding his machine.

To this end my invention consists in providing the inner ends of the handle-bars of a bicycle with teeth, and pivoting said handle-bars in the head of the front standard of said bicycle, so that the teeth on said ends will mesh with each other, and a block or detent movable in said head adapted to engage and disengage the said teeth on the inner ends of the handle-bars.

In the drawings the letter $d$ represents the top of the front standard of a bicycle, with the rear part broken away.

$a\ a$ represent the handle-bars, having their inner ends $a'\ a'$ toothed and pivoted at $e\ e$, respectively, so as to mesh with each other.

$b$ represents a block or detent angular in cross-section, movable laterally in the head $d$ at right angles to and adapted to engage and disengage the toothed ends of the handle-bars at the will of the rider and hold said handle-bars in any desired position. The block $b$ is provided with an extension $b'$, which projects through an orifice in the head $d$, and is provided with a head $b^2$, between which and the outer surface of the head $d$ is interposed the spring $s$, which serves to hold the block $b$ normally in engagement with the toothed ends $a'\ a'$.

The operation of the device is as follows: A person being mounted on and propelling his bicycle desiring to change the level of his handle-bars presses the head $b^2$ with his thumb, thereby compressing the spring $s$, forcing the block sidewise through the head $d$ sufficiently far for the purpose of disengaging the block $b$ from the toothed ends of the handle-bars. He then raises or lowers the handle-bars to the desired level and releases the head $b^2$ from the pressure of his thumb, and the spring $s$ forces the block $b$ into engagement with the toothed ends $a'\ a'$, which holds the handle-bars in the desired position. The above operation is accomplished in a moment of time and without dismounting from the machine.

I claim—

In a bicycle, the handle-bars pivoted at their inner ends and provided with teeth which mesh together at a point in a line with the pivots upon which they turn, combined with an angular block or detent which is laterally movable and is provided with a head $b^2$, and the spring $s$ applied to the head, whereby the detent or block may be pushed laterally so as to become disengaged from the teeth of the handle-bars, and thus the handle-bars left free to be adjusted at the will of the rider, substantially as shown and described.

ARTHUR CATUDAL.

Witnesses:
HARRY LAMONT,
HOECTOR FORAND.